(12) United States Patent
Prod'homme et al.

(10) Patent No.: US 12,345,269 B2
(45) Date of Patent: Jul. 1, 2025

(54) METHOD FOR OPERATING AN ELECTRIC AIR COMPRESSOR ASSEMBLY

(71) Applicant: VOLVO TRUCK CORPORATION, Gothenburg (SE)

(72) Inventors: Nathan Prod'homme, Lyons (FR); Hugo Bebon, Vaulx en Velin (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 283 days.

(21) Appl. No.: 17/760,067

(22) PCT Filed: Feb. 5, 2020

(86) PCT No.: PCT/EP2020/052884
§ 371 (c)(1),
(2) Date: Aug. 3, 2022

(87) PCT Pub. No.: WO2021/155923
PCT Pub. Date: Aug. 12, 2021

(65) Prior Publication Data
US 2023/0063275 A1    Mar. 2, 2023

(51) Int. Cl.
*F04D 27/00* (2006.01)
*B60T 13/26* (2006.01)

(52) U.S. Cl.
CPC ......... *F04D 27/006* (2013.01); *B60T 13/268* (2013.01)

(58) Field of Classification Search
None
See application file for complete search history.

(56) References Cited

U.S. PATENT DOCUMENTS 4,462,610 A * 7/1984 Saito .................. B60G 17/0408
180/41
5,054,294 A * 10/1991 Dudley .............. G05D 23/1912
62/158

(Continued)

FOREIGN PATENT DOCUMENTS

CN       205509471 U    8/2016
EP        2708429 A1    3/2014

(Continued)

OTHER PUBLICATIONS

International Search Report and Written Opinion in corresponding International Application No. PCT/EP2020/052884 mailed Nov. 9, 2020 (15 pages).

(Continued)

*Primary Examiner* — Jonathan M Dager
(74) *Attorney, Agent, or Firm* — Venable LLP; Jeffri A. Kaminski

(57) ABSTRACT

A method for operating an electric air compressor assembly. The assembly includes an electric motor and a compressor which is mechanically coupled to the electric motor and which is capable of providing compressed air to a tank The method comprises monitoring the temperature of at least one component of the electric air compressor assembly and controlling the motor speed as a function of said temperature running the motor at a first speed S1, which results in the temperature increasing; when the temperature reaches a temperature threshold, which is lower than a maximum admissible temperature, running the motor at a second speed S2>S1 until a predetermined desired pressure in the tank is reached.

11 Claims, 3 Drawing Sheets

(56) References Cited

U.S. PATENT DOCUMENTS

| | | | |
|---|---|---|---|
| 5,267,446 A | 12/1993 | Viegas | |
| 6,799,950 B2* | 10/2004 | Meier | B60G 13/14 417/32 |
| 7,441,782 B2* | 10/2008 | Stiller | B60G 17/0523 280/6.15 |
| 8,152,475 B2* | 4/2012 | Sorge | F04B 49/065 417/32 |
| 10,315,488 B2* | 6/2019 | Miyakoshi | B60H 1/00921 |
| 10,333,448 B2* | 6/2019 | Yoo | H02P 21/14 |
| 2003/0070442 A1* | 4/2003 | Adaniya | B60H 1/3222 62/323.4 |
| 2003/0228229 A1* | 12/2003 | Yoshimura | F04C 18/16 417/199.1 |
| 2003/0230101 A1* | 12/2003 | Iritani | F25B 49/005 62/228.3 |
| 2004/0175272 A1* | 9/2004 | Kisak | F04B 49/06 417/42 |
| 2004/0191073 A1* | 9/2004 | Iimura | F04B 49/065 417/44.2 |
| 2005/0183434 A1 | 8/2005 | Iritani et al. | |
| 2006/0260304 A1* | 11/2006 | Ishiwatari | F02D 23/00 60/599 |
| 2010/0172764 A1* | 7/2010 | Nakano | H02P 29/032 417/44.11 |
| 2012/0212169 A1* | 8/2012 | Wu | H02P 21/141 318/432 |
| 2012/0234030 A1* | 9/2012 | Hagita | F25B 49/025 62/129 |
| 2015/0158471 A1* | 6/2015 | Ezoe | B60T 7/22 701/70 |
| 2015/0176575 A1* | 6/2015 | Nemeth | F04B 49/022 417/34 |
| 2016/0134226 A1* | 5/2016 | Najima | H02P 29/032 318/472 |
| 2017/0037844 A1* | 2/2017 | Takeuchi | F04B 49/10 |
| 2021/0190056 A1* | 6/2021 | Brown | F04B 53/16 |
| 2023/0249515 A1* | 8/2023 | Gutowski | B60H 1/00778 701/36 |

FOREIGN PATENT DOCUMENTS

| | | |
|---|---|---|
| EP | 3128172 A1 | 2/2017 |
| EP | 3364035 A1 | 8/2018 |
| IT | 20040092 A1 | 5/2004 |
| KR | 20070109541 A | 11/2007 |
| TW | M271753 U | 8/2005 |
| TW | M303341 U | 12/2006 |
| WO | 2014040932 A1 | 3/2014 |
| WO | 2016066406 A1 | 5/2016 |

OTHER PUBLICATIONS

Chinese Office Action dated Apr. 12, 2024 in corresponding Chinese Patent Application No. 202080095624.X, 11 pages.

Chinese Office Action dated Sep. 15, 2024 in corresponding Chinese Patent Application No. 202080095624.X, 8 pages.

Chinese Notice of Grant dated Dec. 12, 2024 in corresponding Chinese Patent Application No. 202080095624.X, 6 pages.

* cited by examiner

METHOD FOR OPERATING AN ELECTRIC AIR COMPRESSOR ASSEMBLY

CROSS-REFERENCE TO RELATED APPLICATIONS

This application is a U.S. National Stage application of PCT/EP2020/052884, filed Feb. 5, 2020 and published on Aug. 12, 2021, as WO 2021/155923, all of which is hereby incorporated by reference in its entirety.

TECHNICAL FIELD

The invention relates to a method for operating an electric air compressor assembly, especially in a vehicle. The invention also relates to an arrangement comprising an electric air compressor assembly controlled according to this method, and to a vehicle comprising such an arrangement.

BACKGROUND

Air compressors are used to provide compressed air to actuate various components. In particular, in a vehicle, air can be provided to brakes and pneumatic auxiliaries.

The invention more particularly relates to an electric air compressor, in which the compressor is driven by an electric motor. For example, it can be implemented on a hybrid vehicle or a full electric vehicle. The invention can be applied in light, medium and heavy-duty vehicles, such as trucks, buses and construction equipment.

An electric air compressor assembly includes mechanical components in motion inside a housing, as well as electronic components, which components get hot when the compressor runs. The temperature can be further increased due to the location of the electric air compressor assembly on the vehicle chassis (under the cab for example).

It is of paramount importance to prevent overheating, for not damaging the electric air compressor assembly. Moreover, a too high temperature of the electric air compressor generates a failure message which entails the electric air compressor shutdown and results in the vehicle being stopped, which of course is not desirable.

To ensure a proper functioning of the electric air compressor, there have been proposed solutions to avoid overheating.

One known solution consists in providing a liquid cooling system. Such a system comprises a circuit in which flows a cooling liquid, the circuit typically including a pump, a fan and a radiator for cooling down the fluid. This solution is very efficient but can pose significant problems in terms of design and packaging, as it requires installing pipes towards, around and from the electric air compressor.

Another known solution consists in providing an air cooling system, which includes a fan fixed near the housing of the electric air compressor assembly or directly on it, for blowing air towards the components to be cooled. Such a system is less efficient and noisier than a liquid cooling system, and may also pose design and packaging problems.

Besides, there may be provided a controller configured to receive relevant data and to accordingly provide an appropriate control of the electric air compressor assembly. For example, the electric air compressor assembly may be controlled based on noise level. In many cases, this allows preventing the electric air compressor temperature to become too high. However, the regulation may lack precision, responsiveness or reliability.

The above solutions are therefore not fully satisfactory. In addition, they may not prevent overheating in specific conditions such as high ambient temperature or very intensive use.

SUMMARY

An object of the invention is to provide a method for operating an electric air compressor assembly which solves at least part of the problems of the prior art methods.

The electric air compressor assembly includes an electric motor and a compressor which is mechanically coupled to the electric motor and which is capable of providing compressed air to a tank. Such an assembly can typically be installed in a vehicle.

According to the invention, the method comprises:
monitoring the temperature of at least one component of the electric air compressor assembly and controlling the motor speed as a function of said temperature;
running the motor at a first speed S1, which results in the temperature increasing;
when the temperature reaches a temperature threshold T1, which is lower than a maximum admissible temperature Tmax, running the motor at a second speed S2>S1 until a predetermined desired pressure in the tank is reached.

Thus, according to the invention, there is provided a thermal management of the electric air compressor assembly based on the motor speed control.

More specifically, one feature of the method of the invention is to request a higher motor speed when temperature is above T1, in order to limit motor and/or compressor overheating, as compared to prior art methods in which the motor speed is made to keep decreasing over time until the desired pressure is reached.

As a result, the invention makes it possible to reach the desired pressure earlier than in the prior art, i.e. in a shorter time, and before the maximum admissible temperature Tmax is reached. Furthermore, owing to this method, the temperature T2 of the assembly when the desired pressure is reached is lower than in the prior art; for example said temperature T2 can be around 90% of the maximum admissible temperature Tmax. In addition, tests have shown that, after the desired pressure is reached, temperature then decreases faster than in the prior art, which provides a significant safeguard against overheating, and therefore against shutdown of the assembly.

Although only two steps are mentioned, namely one first step in which the motor is run at speed S1, and one subsequent second step in which the motor is run at speed S2, this should not be considered as limitative. Thus, the method may include one or more other steps before said first and second steps, in which the motor is run at another speed or other speeds. In other words, the method may comprise a preliminary step in which the motor is run at speed S0 with, for example, S0<S1. Alternatively, the method may comprise successive preliminary steps in which the motor is run at successive speeds $S_{0a}$, $S_{0b}$, etc.

In an embodiment, said successive speeds keep on decreasing, before said second step at speed S2, i.e.: $S_{0a}>S_{0b}>S1$, and then S2>S1.

The method according to the invention may be implemented:
during the inflating phase: from a stopped state of the motor, pressure in the tank is increased from 0 bar to the predetermined desired pressure;

and/or during the cycling phase: once the pressure in the tank has reached the predetermined desired pressure, the compressor is stopped and air is consumed, making pressure decrease down to a lower threshold at which the compressor is started again to make pressure increase up to the predetermined desired pressure, so that a new cycle can begin.

It has to be noted that the temperature threshold T1 should preferably be chosen to meet several requirements. On the one hand, T1 should not be too high, as this would lead to the risk that the temperature could increase above Tmax. On the other hand, T1 should not be too low, otherwise the time during which the motor is run at a higher speed S2 would be longer before the desired pressure is reached. This could be unacceptable in terms of time constraints. Furthermore, this could entail too high power consumption.

In an embodiment: 0.5 Tmax<T1<0.7 Tmax. For example, T1 can be around 0.6 Tmax.

In an embodiment: 1.1 S1<S2<1.3 S1. For example, S2 can be around 1.2 S1.

S1 may be comprised between 2300 and 2700 rpm, for example around 2500 rpm; S2 may be comprised between 2700 and 3300 rpm, for example around 3000 rpm.

The method may comprise monitoring the temperature of the electric motor or the temperature of the compressor. Preferably, only one temperature among that of the electric motor and that of the compressor is monitored. The temperature which is monitored may depend on the designs of the electric motor and of the compressor.

In an embodiment, the motor is run at the second speed S2 during a period which meets at least one of the following definitions:
- said period is comprised between 5 s and 35 s, preferably between 15 s and 25 s;
- in case the method is implemented during the inflating phase, said period is comprised between 5 and 20% of the total inflating phase duration, preferably between 7 and 15%;
- in case the method is implemented during the cycling phase, said cycling phase including a succession of pressure increasing stages and pressure consumption stages, the motor is run at the second speed S2 during at least one pressure increasing stage, and said period is comprised between 5 and 20% of the duration of said pressure increasing stage, preferably between 7 and 15%.

According to another aspect, the invention relates to an arrangement comprising:
- a tank;
- an electric air compressor assembly including an electric motor and a compressor which is mechanically coupled to the electric motor and which is capable of providing compressed air to the tank;
- a temperature sensor for sensing the temperature of at least one component of the electric air compressor assembly;
- a pressure sensor for sensing the pressure in the tank;
- a controller capable of controlling the motor speed as a function of said temperature according to the method as previously described.

According to still another aspect, the invention relates to a vehicle comprising such an arrangement, at least one air actuated component such as brakes or auxiliaries, and a pneumatic circuit for carrying air from the tank to the component(s).

The controller capable of controlling the motor speed as a function of said temperature can be the vehicle ECU (electrical control unit). Alternatively, there can be provided a dedicated controller in the arrangement, said controller being separate from the vehicle ECU.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
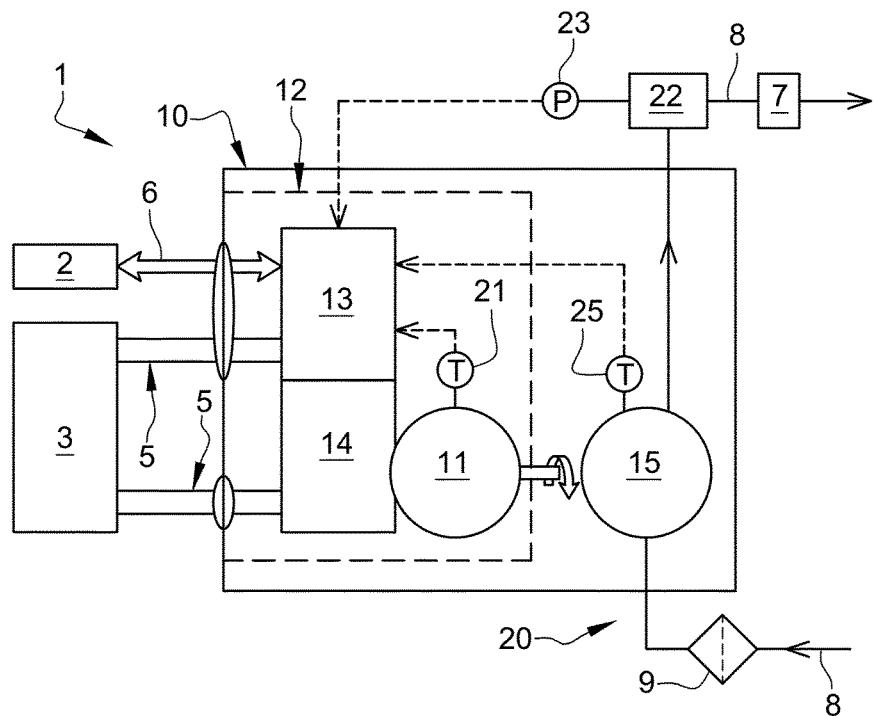
FIG. 1 is a schematic drawing of a vehicle including an electric air compressor assembly according to an embodiment of the invention.

FIG. 1 schematically shows a vehicle 1 equipped with an electric air compressor assembly 10.

The vehicle 1 can be a truck, a bus, a construction equipment, etc. It can be a hybrid vehicle or a full electric vehicle. The vehicle 1 comprises a vehicle ECU 2 (electrical control unit) and a vehicle power network 3.

The electric air compressor assembly 10 includes an electric motor 11 and a compressor 15 which is mechanically coupled to the electric motor 11. The electric motor 11 is part of a motor assembly 12 which further comprises a controller 13 capable of controlling the electric motor 11, and a converter 14.

A power supply line 5 provides the high or low voltage power required to operate the controller 13 and the converter 14 from the vehicle power network 3.

A communication line 6, such as a CAN bus, connects the vehicle ECU 2 and the controller 13 to allow communication between these components. Thus, via the communication line 6, the vehicle ECU 2 can control the controller 13 and the electric motor 11, and the controller 13 can send data and/or status information on the electric motor 11 and/or compressor 15 to the vehicle ECU 2. Such data may include the temperature(s) of the motor or compressor, the voltage(s) of the motor or compressor, etc.

The vehicle 1 further comprises at least one air actuated component 7, such as brakes or auxiliaries, the purpose of the electric air compressor assembly 10 being to provide air to said air actuated component(s) 7. The vehicle 1 is equipped with a pneumatic circuit 8 for carrying said air.

More precisely, in the pneumatic circuit 8, atmospheric air is sucked; it preferably flows through a filter 9 in which it can be dried and cleaned; air then enters the compressor 15 which provides compressed air to a tank 22 before air is carried towards the air actuated component(s) 7.

The electric air compressor assembly 10 is part of an arrangement 20 which can further comprise:
- the tank 22;

a temperature sensor 21 for sensing the temperature of the electric motor 11 and/or a temperature sensor 25 for sensing the temperature of the compressor 15;

a pressure sensor 23 for sensing the pressure in the tank 22;

the controller 13.

The invention provides a method for operating the electric air compressor assembly 10. The method aims at providing an appropriate pressure level to the air actuated component(s) 7, while avoiding too high temperatures that would cause unwanted shutdowns or even damages. According to the invention, such an operating method involves a thermal management of the electric air compressor assembly 10 based on the motor speed control.

The method comprises monitoring the temperature T of at least one component of the electric air compressor assembly 10 and controlling the motor speed S as a function of said temperature T. Said temperature can be the temperature of the electric motor 11, measured by the temperature sensor 21, or the temperature of the compressor 15, measured by the temperature sensor 25.

The method also comprises:
running the motor 11 at a first speed S1, which results in the temperature T increasing;
when the temperature T reaches a temperature threshold T1, which is lower than a maximum admissible temperature Tmax, running the motor 11 at a second speed S2 higher than S1, until a predetermined desired pressure Pset in the tank 22 is reached.

In practice, the motor speed S can be controlled by the controller 13 from the vehicle ECU 2, which sends a specific speed request depending on the measured temperature T, and possibly on further parameters such as the pressure P measured by the pressure sensor 23, any failure detection, etc. Alternatively, the temperature sensor 21 or 25 could directly send the sensed information to the vehicle ECU 2; in this embodiment, the vehicle ECU 2 is capable of directly controlling the motor speed S as a function of said temperature T.

Figure 2:
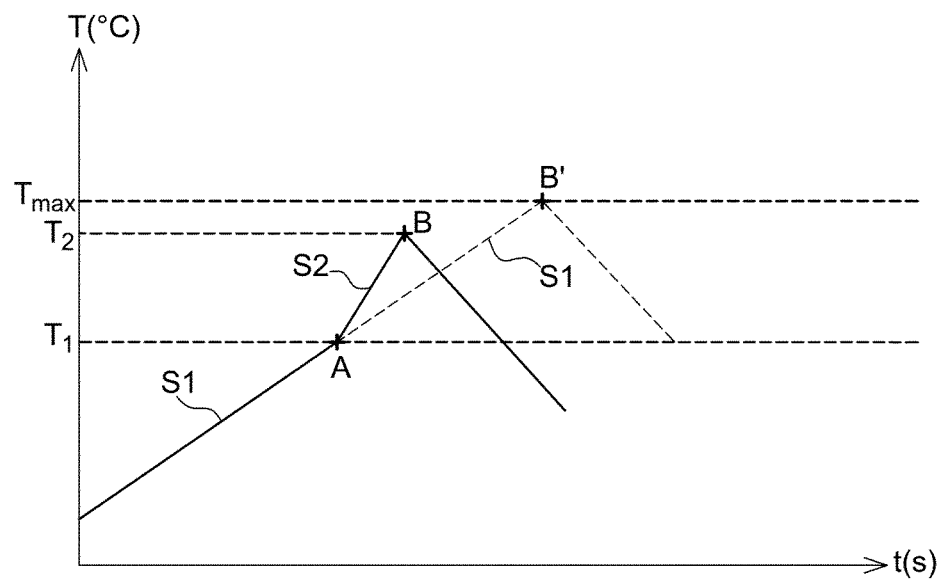
FIG. 2 is a graph of temperature versus time in an assembly of the invention and in the prior art.

FIG. 2 schematically shows the evolution of temperature T over time t.

According to the invention, as illustrated by the solid line, the motor 11 is run at speed S1 during a first step, which results in the temperature T increasing, for example substantially linearly, until it reaches the temperature threshold T1. This corresponds to working point A on the graph. S1 can be comprised between 2300 and 2700 rpm, for example around 2500 rpm, while T1 can be comprised between 0.5 Tmax and 0.7 Tmax, for example around 0.6 Tmax.

From T1, the motor 11 is run at speed S2 which is higher than S1, until the predetermined desired pressure Pset in the tank 22 is reached, which corresponds to working point B on the graph. In an embodiment, S2 is comprised between 1.1 S1 and 1.3 S1. S2 can be comprised between 2700 and 3300 rpm, for example around 3000 rpm. During this subsequent second step, the temperature T increases from T1 to T2, for example substantially linearly. As can be seen in FIG. 2, at point B, i.e. when the predetermined desired pressure Pset has been reached, the temperature T2 is lower than the maximum admissible temperature Tmax which is advantageous, as it provides a safety margin regarding overheating. In practice, T2 can be around 0.9 Tmax.

FIG. 2 also shows in dotted line the evolution of temperature T over time t according to the prior art, wherein, in the period of time illustrated, the motor speed is kept constant at speed S1, until working point B' on the graph. As can be seen, this results in temperature T increasing, for example substantially linearly, up to and then above T1. At point B', the temperature T is higher than the maximum temperature T2 reached thanks to the method of the invention. Moreover, in some operating conditions, the temperature at B' may be equal to Tmax, which requires the compressor 15 to be stopped, even if the predetermined desired pressure Pset in the tank 22 has not been reached.

Comparison between the solid line and the dotted line of FIG. 2 shows that the invention makes it possible to reach the predetermined desired pressure Pset faster than in the prior art, while also ensuring the temperature reached is kept lower and, in any event, lower than the maximum admissible temperature Tmax.

Figure 3:
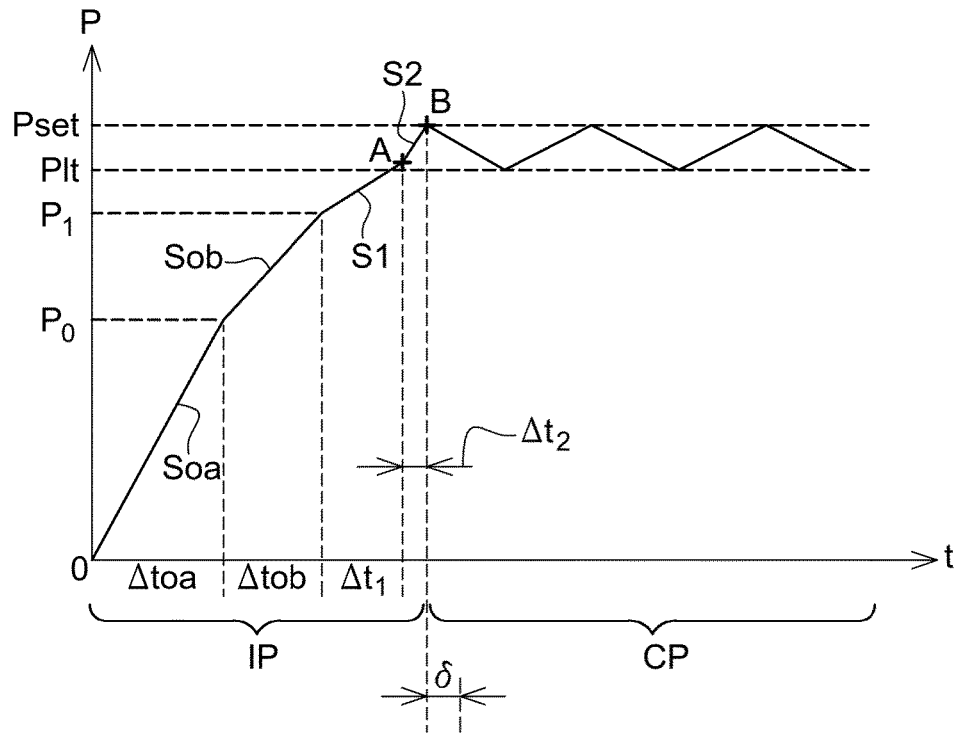
FIG. 3 is a graph of pressure versus time in an assembly of the invention.
Figure 4:
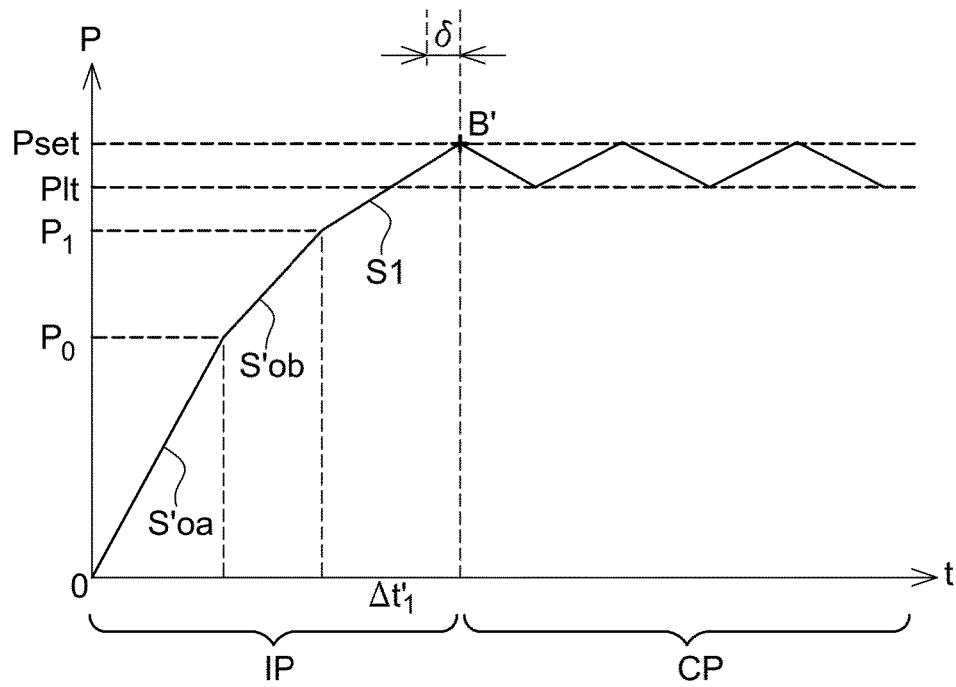
FIG. 4 is a graph of pressure versus time in an assembly of the prior art.
Figure 5:
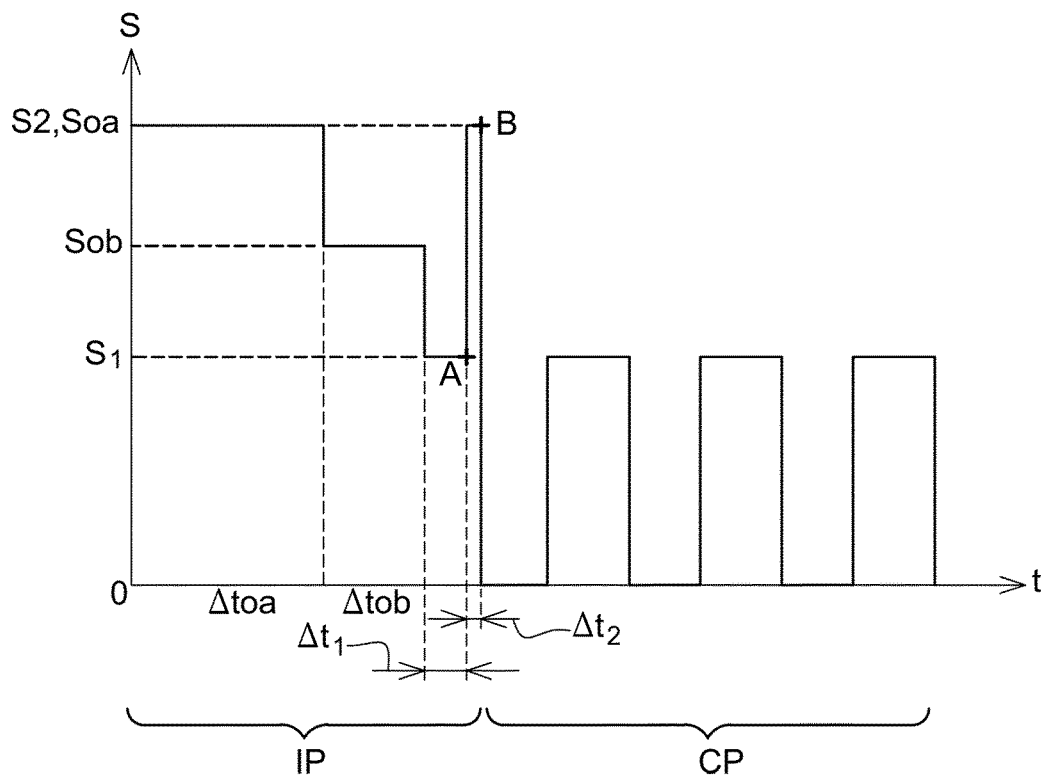
FIG. 5 is a graph of motor speed versus time in an assembly of the invention.
Figure 6:
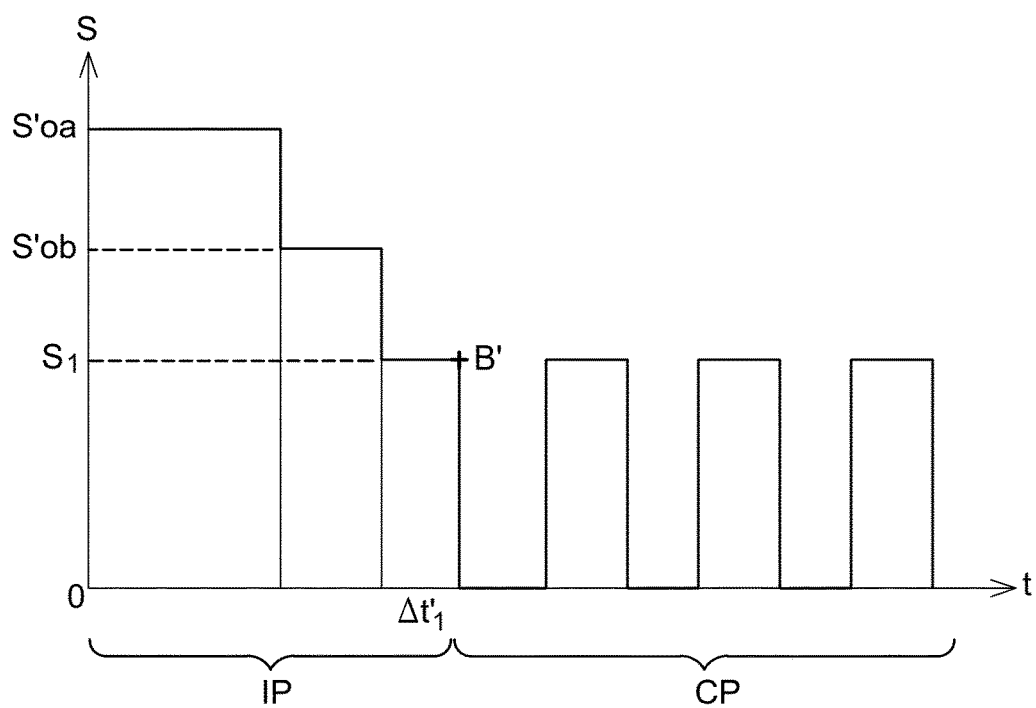
FIG. 6 is a graph of motor speed versus time in an assembly of the prior art.

Reference is now made to FIGS. 3 and 4 which show the evolution of pressure P over time t, respectively with the method of the invention and in the prior art, and to FIGS. 5 and 6 which show the evolution of motor speed S over time t, respectively with the method of the invention and in the prior art.

In the graphs are illustrated both:
an inflating phase IP that is a transition phase in which, from a stopped state of the motor 11, pressure P in the tank 22 is increased from 0 bar to the predetermined desired pressure Pset;
and a cycling phase CP that correspond to a permanent regime once the pressure P in the tank 22 has reached the predetermined desired pressure Pset. The cycling phase CP includes a succession of pressure increasing stages and pressure consumption stages. More specifically, from a pressure equal to Pset, also called Pcut-off, the compressor 15 is stopped and air is consumed, making pressure decrease down to a lower threshold Plt, also called Pcut-in. At this lower threshold Plt, the compressor 15 is started again to make pressure increase up to Pset again, and this cycle repeats.

Pset and Plt are determined so that, in the range of pressure comprised between Plt and Pset, the pressure level provided to the air actuated component(s) 7 is suitable for a proper operation. For example, Pset can be around 10.5 bar while Plt can be around 9-9.5 bar.

FIGS. 3 and 5 show an embodiment in which the method of the invention is implemented during the inflating phase IP.

As can be seen, from 0 bar (i.e. a stopped state of the motor 11), pressure P in the tank 22 is increased during successive steps up to Pset, by the operation of the compressor 15. In this embodiment, the motor speed S is first of all decreased by increments down to S1, which results in the pressure P keeping on increasing, but more and more slowly. Then, from the above mentioned working point A, i.e. when temperature T has reached the temperature threshold T1, the motor speed S is increased to S2 which is higher than the previous value S1 of the motor speed, in the preceding step. This results in an increase of pressure P which is faster than in the preceding step.

In the exemplary embodiment of FIGS. 3 and 5, the inflating phase IP may comprise the following successive steps:
the motor 11 is run at speed $S_{0a}$ during $\Delta t_{0a}$. $S_{0a}$ can be around 3000 rpm; $\Delta t_{0a}$ can be in the range of 150-200 s, for example around 175 s;
the motor 11 is run at speed $S_{0b}$ during $\Delta t_{0b}$. $S_{0b}$ is lower than $S_{0a}$, for example around 2800 rpm; $\Delta t_{0a}$ can be lower than $\Delta t_{0a}$, in the range of 80-110 s, for example around 95 s;

the motor 11 is run at speed S1 during Δt1. S1 is lower than $S_{0b}$, for example around 2500 rpm; Δt1 can be lower than $\Delta t_{0b}$, in the range of 30-50 s, for example around 35 s;

the motor 11 is run at speed S2 during Δt2. S2 is higher than S1, for example around 3000 rpm. However, S2 is not necessarily equal or close to $S_{0a}$. Δt2 can be lower than Δt1, in the range of 20-30 s, for example around 25 s. This step is carried out until the predetermined desired pressure Pset in the tank 22 is reached, which corresponds to working point B.

The last above mentioned step, between working points A and B, during which the motor is run at speed S2 may be carried out during a period Δt2 which is comprised between 5 and 20% of the total inflating phase duration, preferably between 7 and 15%.

Pressure at working point A may be comprised between the lower threshold Plt and the predetermined desired pressure Pset.

The pressure P0 at which the motor speed S changes from $S_{0a}$ to $S_{0b}$ may be around 6-7 bar, while the pressure P1 at which the motor speed S changes from $S_{0b}$ to S1 may be around 8-9 bar.

The pressures P0, P1, as well as the motor speeds $S_{0a}$, $S_{0b}$, S1 in the first steps may be parameters defined in order to respect regulation, noise level, etc.

From working point B, the motor 11 is stopped, and then begins the cycling phase CP, with successive pressure increasing stages and pressure consumption stages. Although the motor speed during the pressure increasing stages is shown in FIG. 5 as being equal to S1, other values are possible.

FIGS. 4 and 6 are similar to FIGS. 3 and 5, respectively, according to a method of the prior art. The inflating phase IP may comprise the following successive steps from 0 bar:

the motor is run at speed $S'_{0a}$, which may be equal to $S_{0a}$, until pressure reaches P0.

This step can last during the same duration $\Delta t_{0a}$ as with the invention;

the motor is run at speed $S'_{0b}$, which may be equal to $S_{0b}$, until pressure reaches P1.

This step can last during the same duration $\Delta t_{0b}$ as with the invention;

and then, the motor is run at speed S1 until the predetermined desired pressure Pset in the tank 22 is reached, which corresponds to working point B'. This step is carried out during Δt'1.

As can be seen from the comparison between FIGS. 3 and 4, Δt'1 is higher than Δt1+Δt2. (the difference being shown by reference 5). In other words, owing to the specific step between working points A and B, during which the motor is run at a higher speed S2>S1, during a short time, the invention makes it possible to reach the predetermined desired pressure Pset earlier than in the prior art. This is of paramount importance as it results in lower temperatures in the motor 11 and compressor 15, which are critical operational factors.

In an embodiment, the duration of inflating phase IF may be reduced by 5-10% with the method of the invention as compared with the prior art.

Owing to the invention, in which a higher motor speed is used for a short time at the end of the inflating phase, and as compared to the prior art method: the predetermined desired pressure Pset is reached earlier, meaning that the inflating phase is shorter; temperature increases faster but to a lower value; compressor is stopped earlier; temperature decreases faster to an acceptable value.

The above description of an embodiment of the method according to the invention should not be considered as limitative.

According to a variant, more or less steps (during which the motor 11 is run at a given speed S) may be carried out before the last step during which the motor 11 is run at speed S2.

Besides, alternatively or in addition, the invention could be implemented during the cycling phase CP. In that case, the motor is run at the second speed S2 during at least one pressure increasing stage, during a period which is comprised between 5 and 20% of the duration of said pressure increasing stage, preferably between 7 and 15%.

It is to be understood that the present invention is not limited to the embodiments described above and illustrated in the drawings; rather, the skilled person will recognize that many changes and modifications may be made within the scope of the appended claims.

The invention claimed is:

1. A method for operating an electric air compressor assembly, said assembly including an electric motor and a compressor which is mechanically coupled to the electric motor and which is configured to provide compressed air to a tank, the method comprising:
monitoring the temperature of at least one component of the electric air compressor assembly and controlling the motor speed as a function of said temperature;
running the motor at a first speed S1, which results in the temperature increasing;
when the temperature reaches a temperature threshold T1, which is lower than a maximum admissible temperature Tmax, running the motor at a second speed S2>S1 until a predetermined desired pressure in the tank is reached.

2. The method according to claim 1, wherein:
0.5 Tmax<T1<0.7 Tmax.

3. The method according to claim 1, wherein:
1.1 S1<S2<1.3 S1.

4. The method according to claim 1, wherein S1 is comprised between 2300 and 2700 rpm, and/or S2 is comprised between 2700 and 3300 rpm.

5. The method according to claim 1, further comprising monitoring the temperature of the electric motor or the temperature of the compressor.

6. The method according to claim 1, wherein the motor is run at the second speed S2 during a period which is comprised between 5 s and 35 s.

7. The method according to claim 1, wherein, in case the method is implemented during an inflating phase, the motor is run at the second speed S2 during a period which is comprised between 5 and 20% of the total inflating phase duration.

8. The method according to claim 1, wherein, in case the method is implemented during a cycling phase, said cycling phase including a succession of pressure increasing stages and pressure consumption stages, the motor is run at the second speed S2 during at least one pressure increasing stage, during a period which is comprised between 5 and 20% of the duration of said pressure increasing stage.

9. An arrangement comprising:
a tank;
an electric air compressor assembly including an electric motor and a compressor which is mechanically coupled to the electric motor and which is configured to provide compressed air to the tank;

a temperature sensor for sensing the temperature of at least one component of the electric air compressor assembly;

a pressure sensor for sensing the pressure in the tank;

a controller configured to control the motor speed as a function of said temperature by:

monitoring the temperature of the at least one component of the electric air compressor assembly and controlling the motor speed as a function of the temperature;

running the motor at a first speed S1, which results in the temperature increasing;

when the temperature reaches a temperature threshold T1, which is lower than a maximum admissible temperature Tmax, running the motor at a second speed S2>S1 until a predetermined desired pressure in the tank is reached.

10. A vehicle comprising the arrangement according to claim 9, at least one air actuated component, and a pneumatic circuit for carrying air from the tank to the component(s).

11. The vehicle according to claim 10, further comprising a vehicle ECU (electrical control unit), and in that the controller is configured to control the motor speed as a function of said temperature is said vehicle ECU.

* * * * *